United States Patent [19]

Tremblay et al.

[11] Patent Number: 5,698,325

[45] Date of Patent: Dec. 16, 1997

[54] METHOD OF MANUFACTURING A SURFACE LAYER MODIFIED, MOLDED ARTICLE OF AROMATIC POLYMER AND THE ARTICLE SO PRODUCED

[75] Inventors: Andre Y. Tremblay, Vanier; Oleh Kotowy, North Gower, both of Canada

[73] Assignee: National Research Council of Canada, Ottawa, Canada

[21] Appl. No.: 599,472

[22] Filed: Jan. 23, 1996

Related U.S. Application Data

[63] Continuation of Ser. No. 257,485, Jun. 9, 1994, abandoned, which is a continuation-in-part of Ser. No. 962,056, Oct. 16, 1992, abandoned, which is a continuation-in-part of Ser. No. 735,546, Jul. 16, 1991, abandoned.

[30] Foreign Application Priority Data

Aug. 15, 1990 [CA] Canada ................................. 2023295

[51] Int. Cl.⁶ ........................... D02G 3/00; C08F 75/00
[52] U.S. Cl. ........................... 428/398; 525/534; 525/535; 525/537; 428/400
[58] Field of Search ......................... 428/398, 400; 525/834, 535, 537

[56] References Cited

U.S. PATENT DOCUMENTS

| | | | |
|---|---|---|---|
| 3,647,751 | 3/1972 | Darsow et al. | 260/49 |
| 4,567,241 | 1/1986 | Kitchens et al. | 525/352 |
| 4,797,457 | 1/1989 | Guiver et al. | 525/534 |
| 4,806,296 | 2/1989 | Brewster et al. | 264/83 |
| 4,833,219 | 5/1989 | Guiver et al. | 525/534 |
| 4,939,228 | 7/1990 | Robeson et al. | 528/171 |
| 4,950,314 | 8/1990 | Yamada et al. | 55/158 |
| 5,175,043 | 12/1992 | Yabe et al. | 428/156 |
| 5,175,196 | 12/1992 | Stopponi et al. | 521/180 |
| 5,322,896 | 6/1994 | Ueda et al. | 525/119 |
| 5,356,459 | 10/1994 | Bikson et al. | 95/54 |

*Primary Examiner*—Helen Lee
*Attorney, Agent, or Firm*—J. Wayne Anderson

[57] ABSTRACT

Molded articles of an aromatic polymer are described having at least a portion of the surface layer of the polymer modified by a heterogeneous reaction of the solid polymer and a reactive solution. The polymer to be treated may contain different repeating units in the said surface layer. The treatment to produce the molded article may comprise casting, injection molding, extending or otherwise shaping the polymer to mold the polymer into a desired shape. The heterogeneous treatment to produce the heterogeneously modified molded article may comprise treating a surface layer of a flat cast sheet in the form of a flat membrane, spirally wound membrane, hollow fiber, or tubular material.

10 Claims, 2 Drawing Sheets

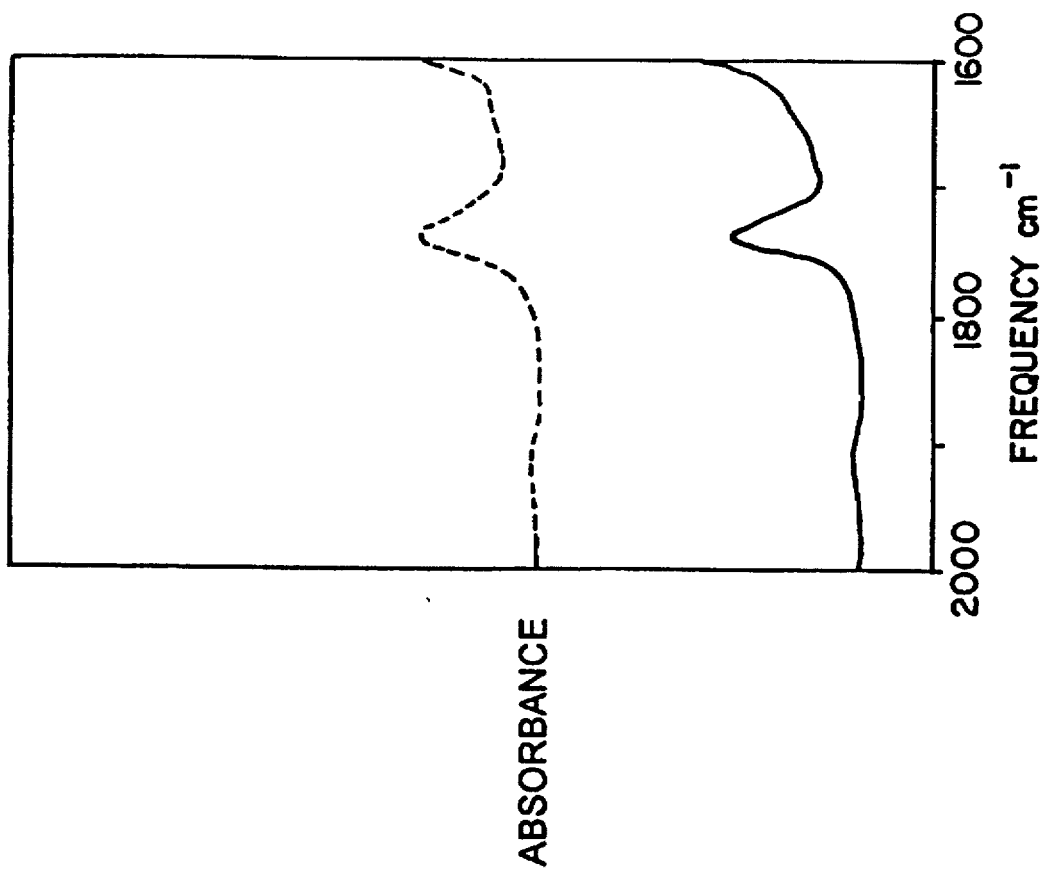

METHOD OF MANUFACTURING A SURFACE LAYER MODIFIED, MOLDED ARTICLE OF AROMATIC POLYMER AND THE ARTICLE SO PRODUCED

This application is a continuation of application Ser. No. 08/257,485, filed on Jun. 9, 1994, now abandoned, which in turn is a continuation-in-part of application Ser. No. 07/962,056, filed on Oct. 16, 1992, now abandoned, which in turn is a continuation of application Ser. No. 07/735,546 filed Jul. 16, 1991, now abandoned.

This invention relates to a method of manufacturing a surface layer heterogeneously modified, molded article of an aromatic polymer and the article so produced.

BACKGROUND OF THE INVENTION

U.S. Pat. No. 4,797,457, dated Jan. 10, 1989, and U.S. Pat. No. 4,833,219, dated May 23, 1989, both by M. D. Guiver et al, disclose aromatic polysulfones, and a process for their production, which contain repeating units of the formula:

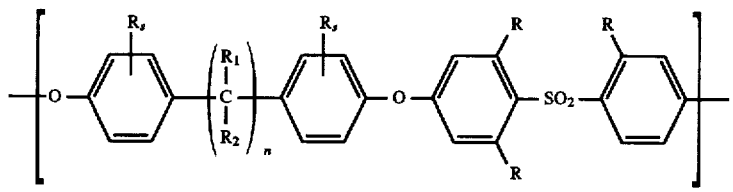

wherein each R is ortho to the sulfone, at least one R per polymer chain is an aliphatic or aromatic substituent, a heteroatom or heteroatom-containing group or a metal or metal-containing group, with any remainder thereof being hydrogen, $R_1$ and $R_2$ each represent alkyl or aryl, each $R_s$ is hydrogen, and n is zero or one. The process comprises:

(a) metalating (e.g. lithiating) a polysulfone, dissolved in a solvent, containing repeating units of the formula:

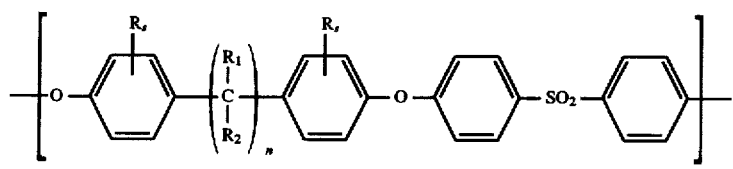

wherein $R_1$, $R_2$, $R_s$ and n are as defined above, so as to form a metalated (e.g. lithiated) polymer containing repeating units of the formula:

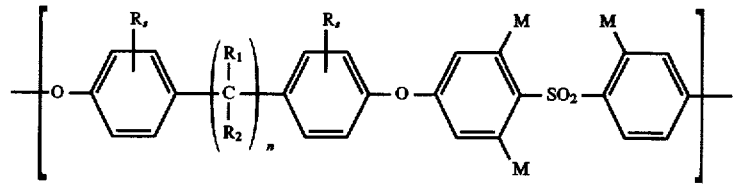

where $R_1$, $R_2$, $R_s$ and n are as defined above, at least one M per polymer chain is metal (e.g. lithium), with any remainder thereof being hydrogen; and (b) Quenching the metalated (e.g. lithiated) product with an electrophile so as to replace the metal (e.g. lithium) substitution by an aliphatic or aromatic substituent, a heteroatom or heteroatom-containing group, another metal or metal-containing group. The substituted polysulfones are useful materials which exhibit improved or modified physical, mechanical and chemical properties, such as glass transition temperature, hydrophilicity, solubility, processability or resistance to chemicals, but which cannot contain any amount of cross-linking which would make the polymer unusable.

While the aromatic polysulfones, and the process for their production, taught by M. D. Guiver et al are useful, the conditions for the homogeneous polymer modification require the use of 80%–90% of tetrahydrofuran as solvent under very cold (−10° C. to −65° C.) temperatures to prevent cross linking, which gives intractable polymers. Large amounts of expensive solvent is first used to dissolve the polymers to about a 10% solution. After lithiation, a large excess of electrophile is provided to saturate the lithiated sites with the desired electrophile, and to prevent cross-linking. After the final reaction the homogeneously modified polymer has to be quenched in a compatible fluid such as an alcohol and further washed with alcohol to remove the remaining traces of tetrahydrofuran. It is not desirable to handle large volumes of expensive solvents. Accordingly, there is a need for a process for manufacturing a molded article of aromatic polymer where only the properties of a surface layer are modified. This is less time consuming and more economical by providing a molded article of an aromatic polymer having a modified surface layer with a particular functionality only at the position where the properties of the modified polymer are needed, and where cross-linking is an advantage.

There is also a need to provide a molded article of aromatic polymer having a surface layer which is cross-linked and which cannot be molded once the cross-linking is effected.

There is also a need to provide a molded article with a modified surface layer with a specific functionality from Victrex® (a polyether sulfone) or RadelA® (a copolymer of polyethersulfone and polyether ether sulfone), which are sparingly soluble in tetrahydrofuran and thus cannot be homogeneously modified, according to the patents by Guiver et al.

SUMMARY OF THE INVENTION

According to the present invention there is provided a method of manufacturing a surface layer heterogeneously modified, molded article of an aromatic polymer, by means of a heterogeneous solid/fluid reaction of the said polymer surface with a fluid (liquid or gas) reagent at ambient temperatures and essentially without the use of solvent. The resulting molded article includes a modified surface layer, the rest being unmodified, the method comprising:

a) treating the polymer to produce a molded article therefrom having at least a portion of the surface layer containing repeating units of the formula:

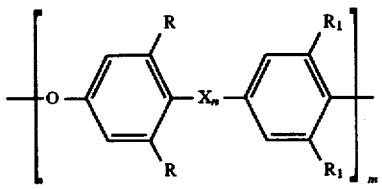

where, n is zero or one, m is the degree of polymerization, and when n is zero, R is H and one of $R_1$ is a labile group which is exchangeable with an alkali metal, the other being H or both of $R_1$ are labile groups which are exchangeable with alkali metal, and when n is one, X is selected from the group consisting of $SO_2$, O, lower alkyl groups and aromatic groups, and i) when X is selected from the group consisting of O, lower alkyl groups and aromatic groups, R is H one of $R_1$ is a labile group such as H and halogen, which is exchangeable with alkali metal, (e.g. lithium), the other being H, or both of $R_1$ are labile groups which are exchangeable with alkali metal, and ii) when X is $SO_2$, $R_1$ is H and one of R is a site or an alpha carbon group which is reactive with alkali metal, the other being H, or both of R are a site or an alpha carbon group which is reactive with alkali metal, then b) contacting said portion of the surface layer, substantially water and solvent free, with alkali metal fluid to metalate said portion of the surface layer.

iii) $R_1$ when it is a labile group, and iv) R when it is a site or an alpha carbon group which is reactive with alkali metal, to provide a molded article with only said portion of the surface layer metalated, and then c) contacting said portion of the metalated surface layer with at least one substance selected from the group consisting of mono, di- and polyfunctional electrophiles to replace the metal substituent with said electrophile to produce a partially cross-linked surface layer modified molded article.

The polymer to be treated may contain repeating units in the said surface layer which contain both R and $R_1$, and the polymer may be treated to produce a surface layer modified molded article, through the process of heterogeneous chemical reaction therefrom with repeating units with formulas containing both i) and ii).

The polymer to be treated may contain different repeating units in the said surface layer, at least some of which contain R and at least some of which contain $R_1$.

The treatment to produce the molded article may comprise casting, injection molding, extruding or otherwise shaping the polymer to mold the polymer into a desired shape. Preferably the surface to be modified would be in contact with a high energy interface such as water to allow the labile groups to be in the vicinity of the solid air interface.

The heterogeneous treatment to produce the modified molded article may comprise treating a surface layer of a flat cast sheet in the form of a flat membrane, spirally wound membrane, hollow fiber, or tubular material.

The polymer may be an aromatic polysulfone, and the treatment may comprise casting the aromatic polysulfone as a porous membrane from a casting solution, gelling the cast membrane in a non-solvent, gelation liquid for the aromatic polysulfone, drying the gelled membrane, and the metalation may be carried out by directly contacting the dried, gelled, aromatic polysulfone with butyl lithium solution which may contain a small amount of an activation, such as tetrahydrofuran or glyme, and then the metalated surface may be rinsed with the electrophile fluid (solution or gas).

Further, according to the present invention there is provided a molded article of a surface layer heterogeneously modified aromatic polymer comprising repeat units of the formula:

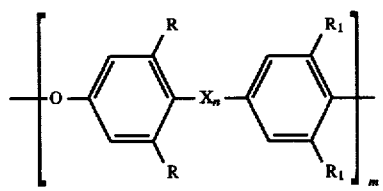

where, n is zero or one, m is the degree of polymerization.

The modified alkali metal substituent may be a monovalent, divalent or polyvalent electrophile in the form of a fluid, e.g. a solution or a mixture of electrophile solutions chosen from monovalent, and multivalent electrophiles. A gaseous electrophile could also be used.

The electrophile may be $CO_2$, $Si(CH_3)_2 Cl_2$, di-anhydride, di-ketone, Tris (2,3-dibromopropyl) isocyanurate or di-acid chloride, amongst others.

The lithiation may be carried with the aid of a catalyst such as, for example, tetramethylethylenediamine (TMEDA) or hexamethylphosphoric triamide (HMPT) or other tertiary amines, and tetrahydrofuran (THF).

BRIEF DESCRIPTION OF THE DRAWINGS

In the accompanying drawings, FIGS. 1–3 show the IR absorbance plotted against the wavelength obtained by an FT-IR spectrophotometer for the exposed and unexposed surfaces of cast polysulfone membranes of UDEL®3500 some of which have been treated according to the present invention.

DESCRIPTION OF PREFERRED EMBODIMENTS

Figure 1:
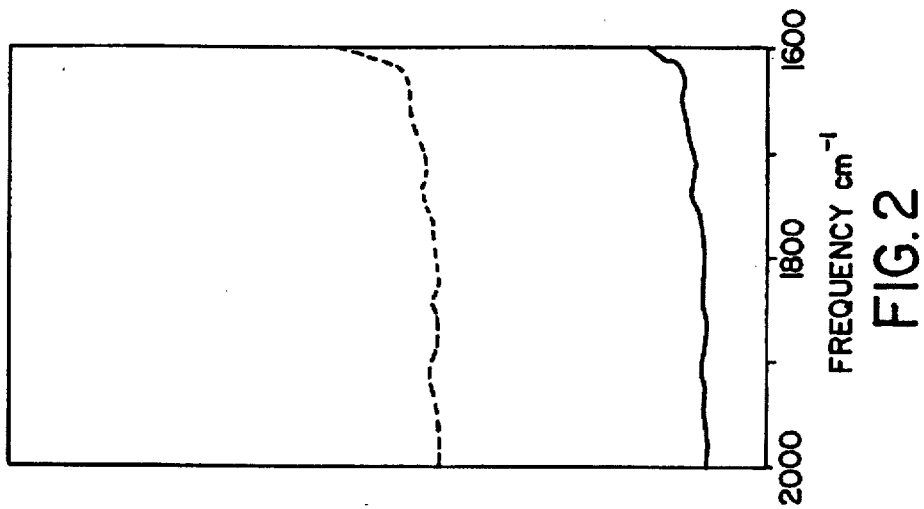

In tests to verify the present invention fibers, filaments and membranes were cast from N-methyl pyrrolydinone (NMP) or dimethyacetamide® (DMA) solutions of the following aromatic polymers: Victrex® a polyethersulphone, Udel® a Bis A polysulfone, Radel R® a polyphenyl sulfone and Radel A® a copolymer of polyethersulfone and polyetherethersulfone, as well as polyphenelene oxide (PPO) sometimes referred to as dimethyl diphenyl oxide (DMPO), as well as halogenated forms of UDEL® and Radel®.

Several casting solution concentrations ranging from 15% to 30% by weight were used.

The cast membranes were extensively washed and then air dried, or were gelled in a gelation liquid and then the gelled membranes were solvent exchanged and air dried, or simply air dried.

Each membrane was then cut up and placed into three groups;

(1) a dry control solid sample.

(2) a solid sample for heterogeneous, surface layer metalation, followed by alcohol quenching to return the polymer to a form where the labile species previously metalated was converted to H, and (3) a solid sample for heterogeneous, surface layer metalation (e.g. with butyl lithium), followed by contacting the metalated surface layer with a monovalent, divalent, or polyvalent electrophile in the form of a solution or gas such as, for example, $CO_2$, $Si(CH_3)_2 Cl_2$, propyl sultone, a di-anhydride, eg. 3,3',4,4'-benzophenone tetracarboxylic dianhydride (BTDA), a di-ketone, (e.g. 4-4'-Bis (dimethylamino) benzophenone, Tris (2,3-dibromopropyl) isocyanurate (TBPI), or a di-acid chloride, e.g. glutaryl chloride (GLU).

Color change was used as an indication of the extent of metalation.

i) on high degree of metalation, as with higher butyl lithium concentrations, the surface layer of the molded polysulfone changed from a yellow to a brown coloration, and ii) on low or no metalation, the surface layer of the molded polysulfone color change to yellow was reduced to negligible intensity or was not present.

When the metalated surface was contacted with an electrophile, the intensity of the color change, due to metalation, was either reduced in intensity or removed entirely, depending on the amount and type of electrophile used. This effect on the color change by the amount and type of electrophile indicated that a reaction had occurred.

The membranes were tested for flux, separation, biological polymer binding, NMR analysis and FTIR analysis, The following examples are indicative of the results obtained by these tests.

Flat membranes of various polymer substances were cast from various solvent casting solutions on to flat glass surfaces, in dry air, moist air or liquid by hydrocasting (i.e. directly cast into a gelation liquid without any contact with air). After gelation, the cast membranes were dried and then contacted with a hexane solution of butyl lithium at a concentration preferably between 1.0 Molar to 0.02 Molar.

The following Table I shows the various polymers used, and the color change, if any, from white after lithiation with a 0.5 Molar Butyl Lithium solution.

TABLE I

Sheet Membranes

| Test No. | Polymer | Solvent Casting Solution | Casting Environment | Color of Exposed Surface After Lithiation | Color of Unexposed Surface after Lithiation |
|---|---|---|---|---|---|
| 1 | Udel ® 3500 | NMP | Dry air 30 sec. | Yellow | White |
| 2 | Victrex ® 200P | NMP | Dry air | Brown | White |
| 3 | Victrex ® 200P | DMA | Dry air | Brown | White |
| 4 | Radel R ® | NMP | Dry air | Yellow | White |
| 5 | Radel A ® | NMP | Dry air | Brown | White |
| 6 | Udel ® 3500 | THF | Dry air | White | White |
| 7 | Udel ® 3500 | NMP | Hydrocast | Yellow | White |
| 8 | Udel ® 3500 | NMP | 60% RH 20 min. | White | White |
| 9 | P2-6DMPO | NMP | Dry air | Yellow | Yellow |
| 10 | Udel ® 3500 Br$_2$ | NMP | Dry air | Brown | Yellow |
| 11 | Radel R ® Br$_2$ | NMP | Dry air | Brown | Yellow |

The lithiated flat membrane from test No. 1, for treatment with an electrophile, was contacted in two tests with $CO_2$; in one test the $CO_2$ was in gaseous form and in the other test the $CO_2$ was in the form of a $CO_2$/hexane solution bath at reduced temperatures. This resulted in a reaction which produced a modified surface layer on the membrane comprising a partially crosslinked polysulfone with carboxylic acid lithium salt derivative substitutions in the room temperature gas electrophile and a much lesser amount of cross-linkage using the low temperature bath.

The modified, exposed surface layer was then acid treated (e.g. HCl acid) to remove the lithium present and leave the substitutions in a carboxylic acid form which was amenable to FTIR spectrophotometer analysis after $SF_6$ contacting.

The modified, exposed surface was then placed against a germanium crystal and an FT-IR spectrum was run on an NICOLET® FT-IR spectrophotometer. The unexposed surface was also analyzed in this manner.

The FT-IR spectra obtained from both surface layers of the lithiated membrane in test No. 1 is shown in FIG. 1, where IR absorbance is plotted against the wavelength and ------ is for the modified, exposed surface layer and _____ is for the unexposed surface layer. These results indicated that for tests No. 1–8, —COOH groups were present in repeating units in the modified exposed surface layer by a characteristic peak at about a wave number of 1740 and wave number range at about 1700 to 1780. This characteristic peak was not present for the spectra obtained for the unexposed surface thus indicating that —COOH groups were not present in repeating units in the surface layer on that side of the membrane.

Contacting the membranes containing different amounts of —COOH groups with caustic soda produced a gelatinous layer on the contacted surfaces. The amount of cross-linking was not quantitatively determined, but it was noted that the gelatinous layer did not wash off at higher degrees of cross-linking. In general the amount of —COOH groups could also not be quantitatively determined amongst different membranes because of different amounts of labile groups which are affected by the density of the polymer at the interface.

Figure 2:
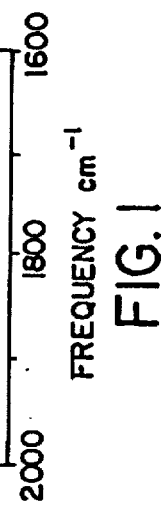

FIGS. 2 and 3 are similar to FIG. 1 but show the results of FT-IR surface analysis of unreacted (Dry control) and Udel® from homogeneous reaction respectively. As will be seen from Tables 1 to 3 and FIGS. 2 and 3, the surface layers of the cast membranes of polysulfones that had been in contact with dry air, moist air or liquid during casting, a higher surface energy hereinafter referred to as the modified exposed surface layers, generally were lithiated, except for test Nos. 6 and 8, while the surface layers in contact with the flat glass surfaces, low surface energy, hereinafter referred to as the unexposed surface layers, generally were not lithiated, except for test No. 6.

The test No. 6 indicated that Udel®3500 cast from a solution in THF was not metalatable in a molded state. It can be only a matter of speculation whether there were no labile sites, or the butyl lithium was consumed by excessive moisture that could have been present in this denser molded film.

Test No. 9, which was for cast polyphenelene oxide (DMPO) showed that both the exposed and unexposed surface layers were lithiated. From this, it will be seen that, for aromatic polymer cast membranes that metalate (e.g. lithiate) in this manner, any areas that are not to be metalated (e.g. lithiated) will need to be treated (e.g. masked) in order not to be metalated (e.g. lithiated) during metalation. At any rate, it is not generally undesirable to have other surfaces besides the target surface be heterogeneously metalated, except that some excess metalating agent may be consumed. This is off-set by the potential to cross-link all surfaces with the cross-linking electrophile and render the structure more chemically and physically stable.

Test Nos. 10 and 11 gave much deeper brown colours than the respective non-halogenated solid molded article on metalation with butyl lithium. Subsequent heterongeneous reaction with a solution of electrophiles (e.g. dilute solution of acetaldehyde in hexane followed by dilute solution of glutaryl chloride.

Two possible reasons why in tests Nos. 1–8, only the exposed surface layers were metalatable (e.g. lithiatable) even though both the exposed and unexposed surface layers were contacted with the hexane solution of butyl lithium are given below.

i) different availability of reaction sites between the exposed and unexposed surface layers. Rapid gelation of the exposed surface immobilizes polymer molecules at this point leaving $SO_2$ groups available for participation in metalation. On the unexposed surface layer the gelation process is slower and $SO_2$ groups can revert into solvent rich domains leaving no active sites for metalation.

ii) different polymer densities between the exposed and unexposed surface layers. Rapid gelation of the exposed surface layer causes intermolecular distances between polymer chains to be larger (lower density) as opposed to the unexposed surface layer where gelation is slower and polymer chains are closer to each other (higher density) but are much more prone to voids and overall more porous. Lower polymer densities increase the accessibility of the metalating species (e.g. butyl lithium) and metalation can occur. Higher polymer densities reduce the accessibility of the metalating species (e.g. butyl lithium) which inhibits metalation.

The membranes produced in Table 1 were contacted with various electrophiles under different conditions to provide membranes having a surface layer with the desired substitutions. These membranes were then tested in a standard permeability cell at 25° C. and 50 psig. The pure water permeability (PWP) and product rate (PR) for the permeation of a solution containing 200 ppm of bovine serum albumen solution (BSA) were determined, and values of the PR/PWP ratio are shown in Table II. The PR/PWP ratio indicates the extent of protein absorption at the surface of the membrane. Low values indicate excessive adsorption on the surface of the membrane.

The substitution with Ethanol is expected to produce the original polymer. This is seen in Table II, where the PR/PWP ratio for the Ethanol substitution is identical to that of the dry control. Reactions with, Acetone, $CO_2$, $Si(CH_3)_2Cl_2$ and GLU have modified Udel®3500, Victrex® 200p, Radel R® and Radel A® as seen by a substantial reduction in the PR/PWP ratio of these membranes.

TABLE II

PR/PWP Ratio for Electrophilic Substitutions.
Membranes tested at 50 psig. with a 200 ppm BSA solution

| | PR/PWP Ratio | | | | | |
|---|---|---|---|---|---|---|
| | Dry | Electrophiles | | | | |
| Polymer | Control | Ethanol | Acetone | $CO_2$ | $Si(CH_3)_2Cl_2$ | GLU |
| Udel ® | 0.56 | 0.57 | 0.38 | 0.32 | 0.37 | 0.28 |
| Victrex ® | 0.65 | 0.64 | 0.41 | 0.22 | 0.26 | 0.30 |
| Radel R ® | 0.81 | 0.82 | 0.50 | 0.31 | 0.43 | 0.28 |
| Radel A ® | 0.82 | 0.82 | 0.81 | 0.25 | 0.44 | 0.55 |

Fibres of polysulfone were hydrocast into a water/solvent (NMP) gelation liquid to provide an external surface which simulated the casting and the gelation of the inside surface of an extrusion, molded, hollow fibre. Other polysulfone fibres were extrusion molded into dry air followed by gelation in water. All of the fibers were dried by solvent exchange or in ordinary air and then their external surfaces were heterogeneously metalated and treated with electrophile as previously described.

The following Table III shows the color changes from white that occurred and which were indicative of a lithiation reaction having occurred.

TABLE III

| | Fibers | | | |
|---|---|---|---|---|
| Test No. | Polymer | Casting Solvent | Casting Environment | Color of External Surface after Lithiation |
| 12 | Udel ® | NMP | Hydrocast | Yellow |
| 13 | Udel ® | NMP | Dry air | Yellow |

If the molding process does not produce a molded article having a metalatable surface layer, it is within the scope of the present invention to treat the surface layer, or at least one portion thereof, to render it metalatable. This can be done, for example, by contacting the surface with a solvent such as NMP, quenching the surface with water, allowing the labile site to be made available or have the —$SO_2$— available for participation in the lithiation, drying the surface and then contacting the surface with the hexane solution of butyl lithium. Further reaction with electrophiles (as previously mentioned) would make the surface both functional (for the purpose of achieving a desired objective), and cross-linked for better stability.

We claim:

1. A molded article of an aromatic polymer having a modified surface layer, comprising:

(a) an article molded of an aromatic polymer having repeating units of the formula:

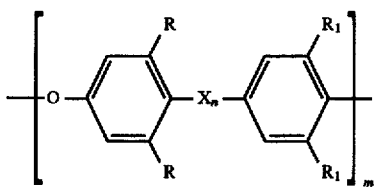

(I)

where n is zero or one, m is the degree of polymerization, and when n is zero, R is H and at least one of $R_1$ is a labile group exchangeable with an alkali metal and any remaining $R_1$ is H, and when n is one, X is selected from the group consisting of $SO_2$, O and lower alkyl groups, and i) when X is selected from the group consisting of O and lower alkyl groups, R is H and at least one of $R_1$ is halogen and any remaining $R_1$ is H, and ii) when X is $SO_2$, $R_1$ is H and at least one of R is a site or an alpha carbon which is reactive with an alkali metal and any remaining R is H, and (b) a modified surface layer of said molded article having repeating units of the formula:

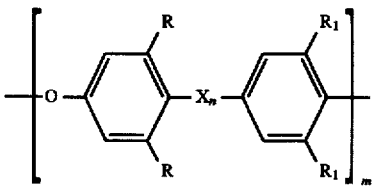

(II)

where n is zero or one, m is the degree of polymerization, and when n is zero, R is H and at least one of $R_1$ is selected from the group consisting of $CO_2$, $Si(CH_3)_2$ $Cl_2$, propyl sultone, a di-anhydride, a di-ketone, Tris (2,3-dibromopropyl) isocyanurate, and a di-acid chloride, and any remaining $R_1$ is H, when n is one, X is selected from the group consisting of $SO_2$, O, and lower alkyl groups, and i) when X is selected from the group consisting of O and lower alkyl groups, R is H and at least one of $R_1$ is selected from the group consisting of $CO_2$, $Si(CH_3)_2$ $Cl_2$, propyl sultone, a di-anhydride, a di-ketone, Tris (2,3-dibromopropyl) isocyanurate, and a di-acid chloride, and any remaining $R_1$ is H, and ii) when X is $SO_2$, $R_1$ is H and at least one R is selected from the group consisting of $CO_2$, $Si(CH_3)_2$ $Cl_2$, propyl sultone, a di-anhydride, a di-ketone, Tris (2,3-dibromopropyl) isocyanurate, and a di-acid chloride, and any remaining R is H.

2. A molded article according to claim 1, wherein the molded article is a membrane.

3. A molded article according to claim 1, wherein the aromatic polymer is selected from the group consisting of polysulfones, (BIS A polysulfone), polyether sulfones, polyphenyl sulfones, a co-polymer of polyether sulfone, and polyetherether sulfone, polyphenylene oxide and halogenated forms of BIS A polysulfone and polyphenylsulfone.

4. A molded article according to claim 1, wherein said modified surface layer is an inner surface layer of a hollow fiber, or tube.

5. A molded article according to claim 1, wherein said modified surface layer is an outer surface layer of a hollow fiber.

6. The molded article of claim 1, wherein the surface layer is at least partially cross-linked.

7. The molded article of claim 6, wherein the surface layer is not remoldable.

8. The molded article of claim 1, wherein the molded article is a cast, injection-molded or extruded article.

9. The molded article of claim 1, wherein the surface layer is sufficient to provide improved physical, mechanical or chemical properties as compared with the molded article.

10. The molded article of claim 9, wherein the surface layer has an improved glass transition temperature.

* * * * *

UNITED STATES PATENT AND TRADEMARK OFFICE
CERTIFICATE OF CORRECTION

PATENT NO. : 5,698,325
DATED : December 16, 1997
INVENTOR(S) : Andre Y. Tremblay; Oleh Kutowy It is certified that error appears in the above-indentified patent and that said Letters Patent is hereby corrected as shown below:

Please correct the spelling of the second inventors last name.

The inventors name should be spelt-- Oleh Kutowy--.

Signed and Sealed this

Seventeenth Day of April, 2001

Attest:

NICHOLAS P. GODICI

Attesting Officer     Acting Director of the United States Patent and Trademark Office